United States Patent Office.

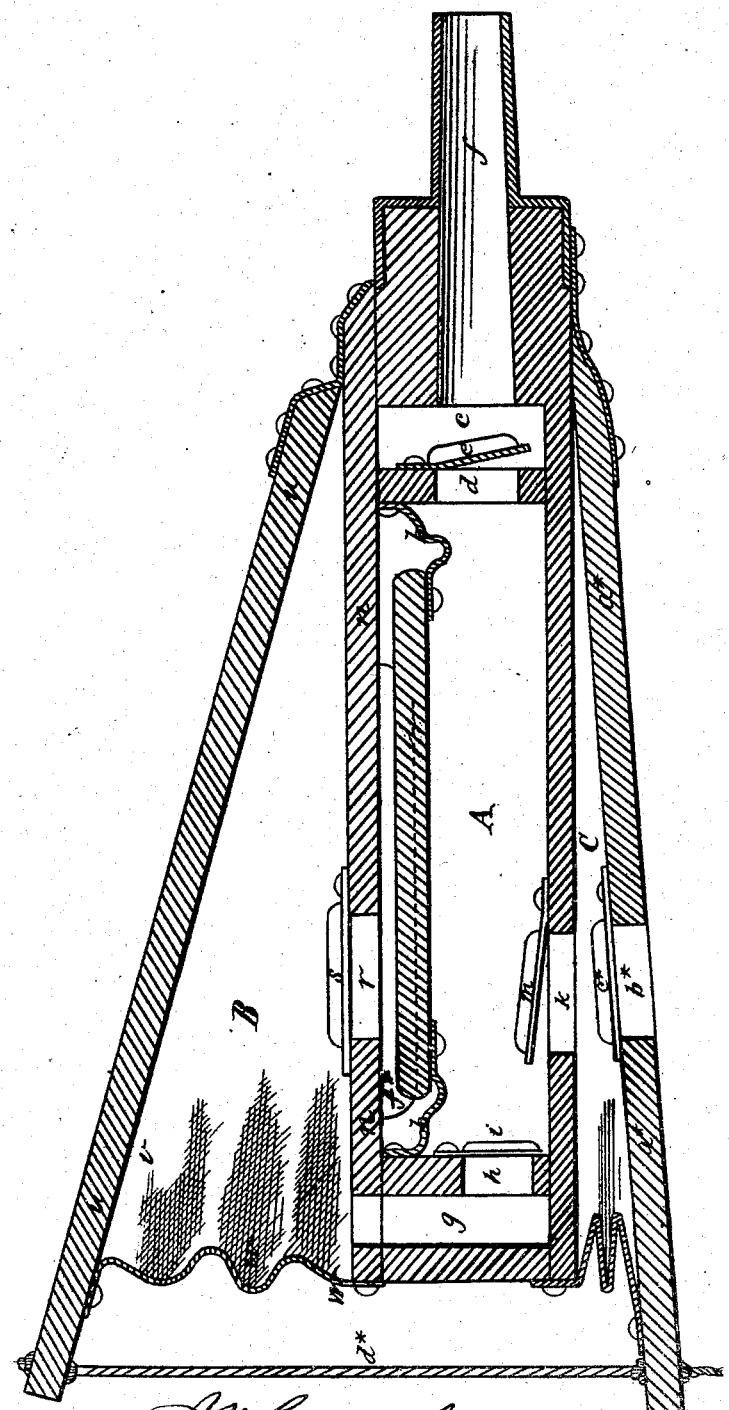

JOHN BOWDEN AND WALTER BOWDEN, OF BUSHWICK, NEW YORK.

Letters Patent No. 74,884, dated February 25, 1868.

IMPROVED BELLOWS.

The Schedule referred to in these Letters Patent and making part of the same.

TO ALL WHOM IT MAY CONCERN:

Be it known that we, JOHN BOWDEN and WALTER BOWDEN, both of Bushwick, in the county of Kings, and State of New York, have invented a new and useful Improvement in Bellows; and we do hereby declare that the following is a full, clear, and exact description of the same, reference being had to the accompanying drawing, making a portion of this specification, which is a vertical longitudinal section of a bellows constructed according to our invention.

This invention consists in a novel arrangement of valves and air-passages in a double-acting bellows, whereby all downwardly-opening valves, which invariably lose a portion of the air before closing, are avoided; also in the application of a yielding cover within or to the central chamber, whereby a steady current of air is forced from the nozzle, regardless of the intermittent action of the bellows or forcing-chambers.

To enable others to understand the construction and operation of our invention, we will proceed to describe it with reference to the drawings.

A represents a central air-reservoir, the top, $a$, of which, is connected with the sides thereof, by means of a flexible annular diaphragm, $b$. Situated in front of this air-reservoir is a valve-chest, $c$, which communicates with the reservoir by means of an opening, $d$, which is provided with a valve, $e$. Opening outward, and extending forward from this valve-chest, is the tubular nozzle $f$. Formed behind the reservoir is a passage, $g$, communicating with such reservoir by means of an opening, $h$, furnished with an inwardly-opening valve, $i$. The bottom of the reservoir has an opening, $k$, furnished with a valve, $m$, which opens inward. The uppermost of the air-forcing chambers is marked B, and the bottom, $n$, thereof, is fixed over the reservoir A, and formed with an opening, $r$, having a valve, $s$, which opens inward. The vibrating top, $u$, of the aforesaid chamber, is hinged, as it were, to the forward end of the bottom, $n$, thereof, the sides and rear end, $w$, of the said chamber, being formed of leather, in a manner similar to the corresponding parts of an ordinary bellows. The other air-forcing chamber of the apparatus is shown at C, and its bottom is formed by a vibrating-board, $a^*$, hinged at its front end, as shown at $a'$, and corresponding to the top, $u$, of the chamber B, the said board being united, by leathern sides and end, to the bottom of the reservoir, in the same manner that the aforesaid top is connected with the bottom, $n$, of the chamber B. This board $a^*$ is provided with an opening, $b^*$, furnished with an inwardly-moving valve, $c^*$, and its free and rearmost end is connected with the corresponding end of the top, $n$, of the chamber B, by a cord, $d^*$, so that when the top of the upper chamber is raised, a corresponding movement is communicated to the board $a^*$ of the lower chamber C. A long slot or opening, $f^*$, is provided in each side of the apparatus, in such manner as to permit the passage of air to the opening $r$, in the bottom of the chamber B, and thence into the said chamber. When the top, $u$, of the chamber B, and the board $a^*$ of the chamber C, are simultaneously moved upward, as just mentioned, the air is expelled from the chamber C through the opening $k$, into the reservoir A, and thence through the opening $d$ to the nozzle $f$, the external air passing into the upper chamber B through the opening $r$, as hereinbefore explained. The movement of the top is then reversed, and the air is forced from the chamber B through the passage $g$ and opening $h$, into the reservoir, and thence to the nozzle $f$, as hereinbefore explained, the board $a^*$ descending by its own weight, so that the lower chamber is again filled with air, passing into the same through the opening $b^*$, the several valves operating to allow or shut off the passage of air through their respective openings, according as the air is forced from one chamber or the other to the reservoir, and the flexible diaphragm $b$ allowing the interior of the reservoir to be enlarged or contracted, according to the volume of air forced into or contained therein, so that by these means the blast or current of air through the nozzle $f$ is rendered uniform and continuous. Instead of being made of the form shown in the drawings, the bellows may be of circular or other suitable or desired shape.

What we claim as our invention, and desire to secure by Letters Patent, is—

1. The arrangement and combination of the valves $c^*$, $s$, $i$, $m$, and $e$, relatively to and with the forcing-chambers C and B, and air-chamber A, substantially as set forth.

2. The cover $a$ of the air-chamber A, connected therewith by an annular flexible diaphragm, arranged for operation in connection with the forcing-chambers B and C, substantially as specified.

3. The arrangement of the side-slots $f^*$ between the fixed and yielding covers of the air-chamber A, for admission of air to the forcing-chamber B, through valve $s$, substantially as shown and described.

JOHN BOWDEN,
WALTER BOWDEN.

Witnesses:
J. W. COOMBS,
G. W. REED.